United States Patent [19]
Tailler

[11] 3,944,720
[45] Mar. 16, 1976

[54] SYSTEM EQUIPPED WITH AN ARRANGEMENT PROVIDING PROTECTION AGAINST THE CORONA EFFECT

[75] Inventor: Louis Tailler, Paris, France

[73] Assignee: Thomson-CSF, Paris, France

[22] Filed: Mar. 17, 1975

[21] Appl. No.: 558,693

[30] Foreign Application Priority Data
Mar. 19, 1974 France .................................. 74.09211

[52] U.S. Cl. ................ 174/73 R; 174/127; 343/874; 343/885
[51] Int. Cl.² ........................................ H01T 19/02
[58] Field of Search ...... 174/73 R, 79, 89, 90, 94 R, 174/94 S, 127, 140 R, 140 S, 144; 339/143 C; 343/841, 842, 847, 851, 874, 875, 885

[56] References Cited
UNITED STATES PATENTS
| | | | |
|---|---|---|---|
| 1,972,616 | 9/1934 | Austin | 174/73 R UX |
| 3,380,061 | 4/1968 | Larson et al. | 343/874 |

*Primary Examiner*—Laramie E. Askin
*Attorney, Agent, or Firm*—Cushman, Darby & Cushman

[57] ABSTRACT

Protection against the Corona effect is obtained, at the junction between a conductor cable and an insulating cable, by means of loops at an acute angle with the insulating cable, these loops being made of conductor elements clamped in the fixing means, and at least one of the loops being formed by the conductor cable itself.

3 Claims, 2 Drawing Figures

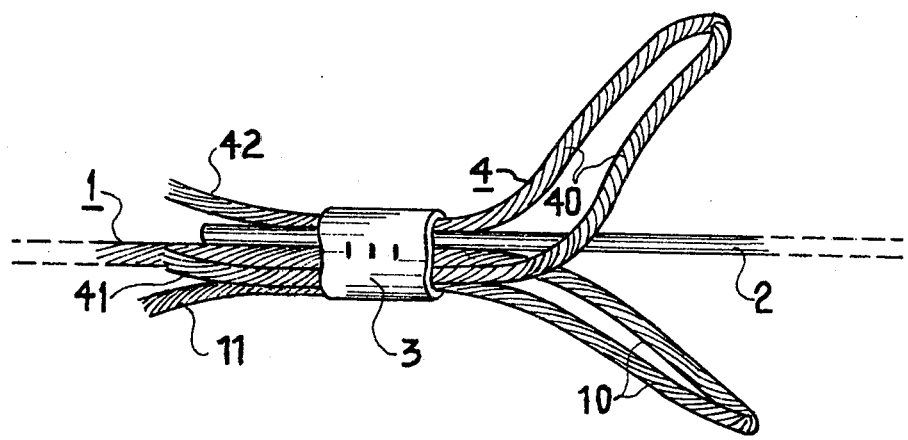
FIG_1
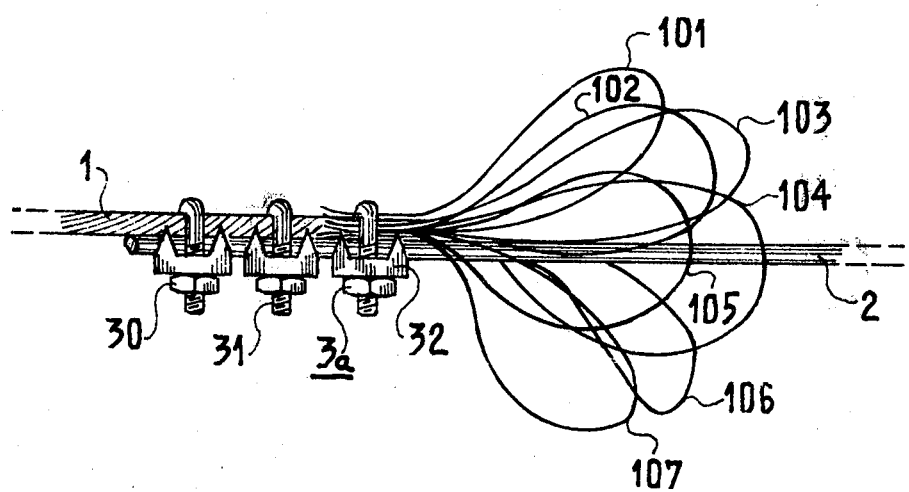
FIG_2

SYSTEM EQUIPPED WITH AN ARRANGEMENT PROVIDING PROTECTION AGAINST THE CORONA EFFECT

The present invention relates to a system equipped with a device to prevent the Corona effect when the end of a conductor cable is fixed to the end of an insulating cable.

The Corona effect is constituted by an electrical discharge which takes place when a point upon a conductor is at a high potential and when, around this point, the potential gradient is in excess of a certain critical value. The Corona effect tends to occur where the end of a conductor cable is fixed to the end of an insulating cable; this is the case, for example, with antennas which, by way of radiator elements, comprise cables carrying potentials in excess of 1000 volts, these cables being stretched between a point upon a mast and a point located at one of the ends of an insulating cable whose other end is attached to the ground.

Devices designed to provide protection against the occurrence of the Corona effect are well-known; the known devices comprise a metal ring attached to the conductor cable by means of metal potential-equalising strips in such a fashion that the plane of the ring is perpendicular to the conductor cable and that the conductor cable passes through the centre of symmetry of the ring. The ring, together with the associated strips, defines the volume within which there is no longer any need to take special precautions in order to reduce the normally large potential gradients which exist at the location of the conductor cable end, the heads of bolts, cable clamps and other components of the fixing element linking the conductor cable to an insulator of the ceramic insulator type.

A protective device of this type operates perfectly, but has several drawbacks. First of all, its price is high due to the cost of the ring with its strips, the cost of the ceramic insulator and the cost of the fixing device. In addition, the ceramic insulator is a fragile component, necessitating the holding of a stock of spares.

The object of the present invention is a system equipped with a device providing protection against the Corona effect, which is simple to produce and efficient, even in rainy weather, at voltages of some few kilovolts on the conductor cable, the device not having the aforementioned drawbacks.

This result is achieved by means of conventional clamping elements, the conductor cable and, possibly, conductor cable runs, in order to form the device which affords protection against the Corona effect.

In accordance with the invention, there is provided a system equipped with an arrangement providing protection against the Corona effect, said system comprising a conductor cable and an insulating cable, and fixing means for connecting said cables together substantially in extension of each other, said arrangement comprising $n$ loops ($n$ being a positive integer) each of which is located substantially in a half-plane which, in relation to said insulating cable, makes an acute angle whose apex lies in said fixing means, said conductor cable passing twice, in reverse directions, through said fixing means so as to form at least one of said loops.

The invention will be better understood and other of its features rendered apparent, from a consideration of the ensuing description and the related drawing in which:

FIG. 1 is a first embodiment of a system in accordance with the invention;

FIG. 2 is a second embodiment of a system in accordance with the invention.

FIG. 1 illustrates a conductor cable 1 connected to an insulating cable 2, by means of a sleeve 3.

The conductor cable arrives from the left-hand side of the drawing, passes through the sleeve 3, forms a loop 10 and passes back through the sleeve 3; the end 11 of the cable 1 reappears at the left-hand side of the sleeve 3. The insulating cable, which arrives from the right-hand side of the figure, is also clamped in the sleeve 3.

An additional loop 40 is formed by means of a section of conductor cable, 4, whose ends 41, 42 are located at the left-hand side of the sleeve 3 shown in the figure. From these two ends, the section of conductor cable passes through the sleeve 3 and then forms the loop 40.

The two loops 10 and 40 are each substantially disposed in a half-plane making an acute angle with the insulating cable 2 and the two half-planes of these two loops are virtually symmetrical in relation to said insulating cable.

By means of an additional sleeve or a metal binding, the ends 11, 41 and 42 are then clamped against the conductor 1 in order to prevent any Corona effect from taking place at the left of the sleeve 3. In the drawing, this latter clamping device has not been shown simply in order to make it easier to follow the paths taken by the various conductors.

It would be equally possible, prior to assembling them together, to cut the conductors so that the ends 11, 41, 42 do not pass beyond the sleeve 3, but this would mean the need for close attention at the time of assembly to the lengths of the different cables and would constitute a source of nuisance.

The two loops 10 and 40, by virtue of their rounded form and the volume which they define between one another, reduce the normally substantial potential gradients occurring at the end of the conductor cable. Consequently, even in rainy conditions and indeed even under conditions of sea fog, the voltage on the conductor 1 can reach several kilovolts without any incidence of Corona effect, and this prevents the insulating cable from deteriorating.

FIG. 2 illustrates a system in accordance with the invention in which the loops for providing protection against the Corona effect are formed by means of the strands of a seven-strand conductor cable 1. The strands of the conductor cable are parted after the cable has passed through a fixing element 3a constituted by three cable clamps 30, 31 and 32. This fixing element is primarily designed to attach the conductor cable 1 to an insulating cable 2 in the same way as the sleeve 3 of FIG. 1, but although for this same kind of application a single sleeve is considered sufficient, it is often necessary, in order to achieve the same fixing security, to utilise three cable clamps in line.

The seven strands of the cable 1 are arranged in order to form 7 loops, 101 to 107, substantially identical to one another and arranged more or less regularly around the insulating cable 2. The free ends of the strands are clamped in one, 32, of the cable clamps of the fixing element 3a.

The seven strands of the conductor 1 are then cut flush with the cable clamp 32. This prevents any Corona effect from occurring to the left of the cable clamp 32 because the cable clamps, due to their rounded form, define a low potential gradient in their neighbourhood and, thus, the small tips of the seven strands run no risk of producing electrical discharges. In FIG. 2, the strands have been shown before their ends have been cut, in order to better illustrate the paths which they follow.

A system of this kind constitutes a means of protection against the Corona effect, which is even better than that offered by the system shown in FIG. 1, but requires more time to produce and therefore costs more.

Other variant embodiments of a system according to the invention are possible. Thus, for example, the number of loops could be reduced to one or could have any value compatible with the clamping possibilities offered by the selected fixing element; similarly, the system in accordance with the invention could comprise several loops made from a multi-strand conductor cable, and one or more supplementary loops formed from pieces of conductor cables.

Of course, the invention is not limited to the embodiments described and shown which were given solely by way of example.

What is claimed is:

1. A system equipped with an arrangement providing protection against the Corona effect, said system comprising a conductor cable and an insulating cable, and fixing means connecting said cables together substantially in extension of each other, said arrangement comprising n loops of conductor elements (n being a positive integer) each of which is located substantially in a half-plane which, in relation to said insulating cable, makes an acute angle whose apex lies in said fixing means, said conductor cable passing twice, in reverse directions, through said fixing means so as to form at least one of said loops.

2. A system equipped with an arrangement providing protection against the Corona effect, as claimed in claim 1, wherein n is greater than 1, wherein said $n$ loops are arranged about said insulating cable and wherein said arrangement comprises $m$ conductive cable sections, $m$ being a positive integer smaller than $n$, each of said sections being clamped in said fixing means so as to form one of said $n$ loops.

3. A system equipped with an arrangement providing protection against the Corona effect, as claimed in claim 1, wherein $n$ is greater than 1 and wherein said conductor cable is formed by a plurality of strands and is divided lengthwise between the first and the second times it passes through said fixing means so as to form a plurality of said $n$ loops.

* * * * *